United States Patent
Chanthasiriphan et al.

(10) Patent No.: US 9,517,405 B1
(45) Date of Patent: Dec. 13, 2016

(54) FACILITATING CONTENT ACCESS ACROSS ONLINE GAMES

(71) Applicant: KABAM, INC., San Francisco, CA (US)

(72) Inventors: Kevin Chanthasiriphan, San Francisco, CA (US); John Kim, San Francisco, CA (US); Kevin Lee, Fremont, CA (US)

(73) Assignee: KABAM, INC., San Francisco, CA (US)

( * ) Notice: Subject to any disclaimer, the term of this patent is extended or adjusted under 35 U.S.C. 154(b) by 0 days.

(21) Appl. No.: 14/207,521

(22) Filed: Mar. 12, 2014

(51) Int. Cl.
  *A63F 9/24* (2006.01)
  *A63F 13/30* (2014.01)
  *A63F 13/60* (2014.01)
  *A63F 13/55* (2014.01)

(52) U.S. Cl.
  CPC ............... *A63F 13/12* (2013.01); *A63F 13/55* (2014.09); *A63F 13/60* (2014.09)

(58) Field of Classification Search
  CPC .......... A63F 13/10; A63F 13/12; A63F 13/55; A63F 13/60
  See application file for complete search history.

(56) References Cited

U.S. PATENT DOCUMENTS

| | | | |
|---|---|---|---|
| 5,816,918 A | 10/1998 | Kelly et al. | |
| 5,933,813 A | 8/1999 | Teicher | |
| 5,964,660 A | 10/1999 | James | |
| 6,142,472 A | 11/2000 | Kliebisch | |
| 6,190,225 B1 | 2/2001 | Coleman | |
| 6,190,255 B1 | 2/2001 | Thomas | |
| 6,347,996 B1 | 2/2002 | Gilmore | |
| 6,402,619 B1 | 6/2002 | Sato | |

(Continued)

FOREIGN PATENT DOCUMENTS

| KR | 1020130137431 | 12/2013 |
|---|---|---|
| WO | WO 2013/059639 | 4/2013 |

(Continued)

OTHER PUBLICATIONS

New Feature: Tiered Tournaments and Tournament Updates, printed from http://community.kabam.com/forums/showthread.php?171349-New-Feat on Feb. 11, 2014, 2 pages.

(Continued)

*Primary Examiner* — James S McClellan
*Assistant Examiner* — Kevin Carter
(74) *Attorney, Agent, or Firm* — Sheppard Mullin Richter & Hampton LLP

(57) ABSTRACT

A system and method for facilitating cross-game content access are disclosed. A set of content may be gated by a non-player character in a first online game. Access to the set of content may be granted in the first online game upon user defeating the non-player character or a character corresponding to the non-player character in a second online game. A notification may be generated in the first online game when a user encounters the non-player character in the first online game. The notification may include information indicating that the non-player character may be defeated in the second online game. In some examples, the non-player character in the first online game may share the same entity state with the corresponding character in the second online game such that they may appear as if there were the same character in the first and second online games.

18 Claims, 3 Drawing Sheets

(56) References Cited

U.S. PATENT DOCUMENTS

| | | | |
|---|---|---|---|
| 6,561,904 B2 | 5/2003 | Locke | |
| 6,604,008 B2 | 8/2003 | Chudley | |
| 6,607,437 B2 | 8/2003 | Casey | |
| 6,745,236 B1 | 6/2004 | Hawkins | |
| 6,850,900 B1 | 2/2005 | Hare | |
| 6,928,474 B2 | 8/2005 | Venkatesan | |
| 7,050,868 B1 | 5/2006 | Graepel | 700/93 |
| 7,076,453 B2 | 7/2006 | Jammes | |
| 7,156,733 B2 | 1/2007 | Chiang et al. | 463/1 |
| 7,192,352 B2 | 3/2007 | Walker | |
| 7,197,352 B2 | 3/2007 | Gott et al. | |
| 7,326,115 B2 | 2/2008 | Baerlocher | |
| 7,533,336 B2 | 5/2009 | Jaffe | |
| 7,660,740 B2 | 2/2010 | Boone | |
| 7,682,239 B2 | 3/2010 | Friedman | |
| 7,698,229 B2 | 4/2010 | Hsu | |
| 7,785,188 B2 | 8/2010 | Cannon | |
| 7,813,821 B1 | 10/2010 | Howell | |
| 7,819,749 B1 | 10/2010 | Fish et al. | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,066,571 B2 | 11/2011 | Koster et al. | 463/42 |
| 8,105,156 B2 | 1/2012 | Walker et al. | |
| 8,147,340 B2 | 4/2012 | Brunet De Courssou et al. | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf et al. | |
| 8,231,470 B2 | 7/2012 | Feeney et al. | |
| 8,246,439 B2 | 8/2012 | Kelly et al. | |
| 8,272,934 B2 | 9/2012 | Olive et al. | |
| 8,272,951 B2 | 9/2012 | Ganz | 463/29 |
| 8,272,956 B2 | 9/2012 | Kelly | |
| 8,282,491 B2 | 10/2012 | Auterio | |
| 8,287,367 B2 | 10/2012 | Hall et al. | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker et al. | |
| 8,317,584 B2 | 11/2012 | Aoki et al. | |
| 8,323,110 B2 | 12/2012 | Shibamiya et al. | |
| 8,328,642 B2 | 12/2012 | Mosites et al. | 463/42 |
| 8,332,260 B1 | 12/2012 | Mysen | |
| 8,332,544 B1 | 12/2012 | Ralls | 710/8 |
| 8,348,762 B2 | 1/2013 | Willis | |
| 8,348,767 B2 | 1/2013 | Mahajan | |
| 8,348,768 B2 | 1/2013 | Auterio et al. | |
| 8,360,858 B2 | 1/2013 | LaRocca | |
| 8,360,866 B2 | 1/2013 | VanLuchene | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann et al. | |
| 8,382,572 B2 | 2/2013 | Hoffman et al. | |
| 8,388,427 B2 | 3/2013 | Yariv | 463/9 |
| 8,401,913 B2 | 3/2013 | Alivandi | |
| 8,408,989 B2 | 4/2013 | Bennett et al. | |
| 8,409,015 B2 | 4/2013 | Van Luchene | |
| 8,439,759 B1 | 5/2013 | Mello | |
| 8,475,262 B2 | 7/2013 | Wolf et al. | |
| 8,506,394 B2 | 8/2013 | Kelly et al. | 463/29 |
| 8,512,150 B2 | 8/2013 | Herrmann | |
| 8,533,076 B2 | 9/2013 | Chu | |
| 8,583,266 B2 | 11/2013 | Herbrich et al. | |
| 8,636,591 B1 | 1/2014 | Hawk | |
| 8,758,119 B1* | 6/2014 | Bronstein Bendayan | H04W 4/206 463/25 |
| 8,777,754 B1 | 7/2014 | Santini | |
| 8,784,214 B2 | 7/2014 | Parks et al. | |
| 8,790,185 B1 | 7/2014 | Caldarone | |
| 8,821,260 B1 | 9/2014 | DeSanti | |
| 8,831,758 B1 | 9/2014 | Chu et al. | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis et al. | |
| 9,007,189 B1 | 4/2015 | Curtis et al. | |
| 9,138,639 B1 | 9/2015 | Ernst | |
| 9,256,887 B2 | 2/2016 | Santini | |
| 9,257,007 B2 | 2/2016 | Santini | |
| 9,286,510 B2 | 3/2016 | Soohoo | |
| 2002/0023039 A1 | 2/2002 | Fritsch | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry et al. | |
| 2002/0119824 A1 | 8/2002 | Allen | |
| 2002/0165794 A1 | 11/2002 | Ishihara | |
| 2002/0183105 A1 | 12/2002 | Cannon et al. | 463/16 |
| 2002/0193162 A1 | 12/2002 | Walker et al. | |
| 2003/0008713 A1 | 1/2003 | Ushiro et al. | 463/42 |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0190960 A1 | 10/2003 | Jokipii et al. | 463/42 |
| 2004/0002387 A1 | 1/2004 | Grady | |
| 2004/0068451 A1 | 4/2004 | Lenk | |
| 2004/0143852 A1* | 7/2004 | Meyers | A63F 13/12 725/133 |
| 2004/0199471 A1 | 10/2004 | Hardjono | |
| 2004/0215524 A1 | 10/2004 | Parkyn | |
| 2004/0225387 A1 | 11/2004 | Smith, III | 700/92 |
| 2004/0267611 A1 | 12/2004 | Hoerenz | |
| 2005/0096117 A1 | 5/2005 | Katz et al. | 463/17 |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |
| 2006/0063587 A1 | 3/2006 | Manzo | |
| 2006/0100006 A1 | 5/2006 | Mitchell | |
| 2006/0116196 A1 | 6/2006 | Vancura | |
| 2006/0155597 A1 | 7/2006 | Gleason | |
| 2006/0200370 A1 | 9/2006 | Ratliff | |
| 2006/0217198 A1 | 9/2006 | Johnson | |
| 2006/0287029 A1 | 12/2006 | Yoshinobu | |
| 2006/0287102 A1 | 12/2006 | White et al. | |
| 2007/0021213 A1 | 1/2007 | Foe et al. | 463/42 |
| 2007/0077988 A1 | 4/2007 | Friedman | |
| 2007/0105615 A1 | 5/2007 | Lind | |
| 2007/0111770 A1 | 5/2007 | Van Luchene | |
| 2007/0129139 A1 | 6/2007 | Nguyen | |
| 2007/0129147 A1 | 6/2007 | Gagner | 463/42 |
| 2007/0155485 A1 | 7/2007 | Cuddy et al. | |
| 2007/0191101 A1 | 8/2007 | Coliz et al. | |
| 2007/0191102 A1 | 8/2007 | Coliz et al. | |
| 2007/0213116 A1 | 9/2007 | Crawford et al. | |
| 2007/0281285 A1 | 12/2007 | Jayaweera | |
| 2008/0004093 A1 | 1/2008 | Van Luchene | |
| 2008/0032787 A1 | 2/2008 | Low | |
| 2008/0058092 A1 | 3/2008 | Schwartz | |
| 2008/0076527 A1 | 3/2008 | Low | |
| 2008/0113706 A1 | 5/2008 | OHalloran | |
| 2008/0113815 A1 | 5/2008 | Weingardt | |
| 2008/0124353 A1 | 5/2008 | Brodeur | |
| 2008/0154798 A1 | 6/2008 | Valz | |
| 2008/0171599 A1 | 7/2008 | Salo et al. | |
| 2008/0194318 A1 | 8/2008 | Kralicky | |
| 2008/0200260 A1 | 8/2008 | Deng | |
| 2008/0214295 A1 | 9/2008 | Dabrowski | |
| 2008/0234043 A1 | 9/2008 | McCaskey | |
| 2008/0268946 A1 | 10/2008 | Roemer | |
| 2008/0275786 A1 | 11/2008 | Gluck | |
| 2009/0011812 A1 | 1/2009 | Katz | |

(56) References Cited

U.S. PATENT DOCUMENTS

| | | | |
|---|---|---|---|
| 2009/0017886 A1 | 1/2009 | McGucken | |
| 2009/0036199 A1 | 2/2009 | Myus | |
| 2009/0048918 A1 | 2/2009 | Dawson | |
| 2009/0061982 A1 | 3/2009 | Brito | |
| 2009/0082099 A1 | 3/2009 | Luciano, Jr. et al. | |
| 2009/0204907 A1 | 8/2009 | Finn | |
| 2009/0208181 A1 | 8/2009 | Cottrell | |
| 2009/0210301 A1 | 8/2009 | Porter | |
| 2009/0234710 A1 | 9/2009 | Belgaied Hassine | |
| 2009/0315893 A1 | 12/2009 | Smith et al. | 345/473 |
| 2010/0022307 A1 | 1/2010 | Steuer et al. | |
| 2010/0035689 A1 | 2/2010 | Altshuler | |
| 2010/0041472 A1 | 2/2010 | Gagner | |
| 2010/0050088 A1 | 2/2010 | Neustaedter | |
| 2010/0070056 A1 | 3/2010 | Coronel | 700/91 |
| 2010/0094841 A1 | 4/2010 | Bardwil | |
| 2010/0099471 A1 | 4/2010 | Feeney et al. | |
| 2010/0107214 A1 | 4/2010 | Ganz | 726/1 |
| 2010/0113162 A1 | 5/2010 | Vemuri et al. | |
| 2010/0174593 A1 | 7/2010 | Cao | |
| 2010/0198653 A1 | 8/2010 | Bromenshenkel | |
| 2010/0210356 A1 | 8/2010 | Losica | |
| 2010/0227682 A1 | 9/2010 | Reville et al. | |
| 2010/0228606 A1 | 9/2010 | Walker | |
| 2010/0241491 A1 | 9/2010 | Eglen | |
| 2010/0306015 A1 | 12/2010 | Kingston | |
| 2011/0065511 A1 | 3/2011 | Mahan | 463/40 |
| 2011/0092271 A1 | 4/2011 | Nguyen | |
| 2011/0092273 A1 | 4/2011 | Cerbini | |
| 2011/0111841 A1 | 5/2011 | Tessmer et al. | |
| 2011/0112662 A1 | 5/2011 | Thompson et al. | |
| 2011/0113353 A1 | 5/2011 | Koh | |
| 2011/0145040 A1 | 6/2011 | Zahn | |
| 2011/0212756 A1 | 9/2011 | Packard | |
| 2011/0218033 A1 | 9/2011 | Englman et al. | |
| 2011/0227919 A1 | 9/2011 | Bongio et al. | |
| 2011/0256936 A1 | 10/2011 | Walker et al. | |
| 2011/0263324 A1 | 10/2011 | Ganetakos | |
| 2011/0275438 A9 | 11/2011 | Hardy | |
| 2011/0281638 A1 | 11/2011 | Bansi | |
| 2011/0281654 A1 | 11/2011 | Kelly et al. | |
| 2011/0282764 A1 | 11/2011 | Borst | |
| 2011/0300923 A1 | 12/2011 | Van Luchene | |
| 2011/0319152 A1 | 12/2011 | Ross | |
| 2011/0319170 A1 | 12/2011 | Shimura et al. | |
| 2012/0011002 A1 | 1/2012 | Crowe | |
| 2012/0015714 A1 | 1/2012 | Ocko et al. | |
| 2012/0015715 A1 | 1/2012 | Luxton et al. | |
| 2012/0034961 A1 | 2/2012 | Berman et al. | |
| 2012/0040743 A1 | 2/2012 | Auterio | |
| 2012/0040761 A1 | 2/2012 | Auterio | |
| 2012/0042282 A1 | 2/2012 | Wong | |
| 2012/0046111 A1 | 2/2012 | Walker | |
| 2012/0047002 A1 | 2/2012 | Patel | |
| 2012/0059730 A1 | 3/2012 | Jensen | |
| 2012/0083909 A1 | 4/2012 | Carpenter et al. | |
| 2012/0101886 A1 | 4/2012 | Subramanian | |
| 2012/0108306 A1 | 5/2012 | Munsell | |
| 2012/0109785 A1 | 5/2012 | Karlsson | |
| 2012/0115593 A1 | 5/2012 | Vann | |
| 2012/0122589 A1 | 5/2012 | Kelly | |
| 2012/0130856 A1 | 5/2012 | Petri | |
| 2012/0142429 A1 | 6/2012 | Muller | |
| 2012/0156668 A1 | 6/2012 | Zelin | |
| 2012/0157187 A1 | 6/2012 | Moshal | |
| 2012/0157193 A1 | 6/2012 | Arezina | |
| 2012/0166380 A1 | 6/2012 | Sridharan | |
| 2012/0166449 A1 | 6/2012 | Pitaliya | |
| 2012/0178514 A1 | 7/2012 | Schulzke et al. | |
| 2012/0178515 A1 | 7/2012 | Adams | |
| 2012/0178529 A1 | 7/2012 | Collard | |
| 2012/0197874 A1 | 8/2012 | Zatkin | |
| 2012/0202570 A1 | 8/2012 | Schwartz | |
| 2012/0202589 A1 | 8/2012 | Kelly | |
| 2012/0203669 A1 | 8/2012 | Borsch | |
| 2012/0215667 A1 | 8/2012 | Ganz | |
| 2012/0221430 A1 | 8/2012 | Naghmouchi | |
| 2012/0226573 A1 | 9/2012 | Zakas et al. | 705/26.2 |
| 2012/0231891 A1 | 9/2012 | Watkins | |
| 2012/0244945 A1 | 9/2012 | Kolo | |
| 2012/0244947 A1 | 9/2012 | Ehrlich | |
| 2012/0244950 A1 | 9/2012 | Braun | 463/42 |
| 2012/0245988 A1 | 9/2012 | Pace | |
| 2012/0256377 A1 | 10/2012 | Schneider et al. | |
| 2012/0282986 A1 | 11/2012 | Castro | |
| 2012/0289315 A1 | 11/2012 | Van Luchene | |
| 2012/0289330 A1 | 11/2012 | Leydon | |
| 2012/0289346 A1 | 11/2012 | Van Luchene | |
| 2012/0295699 A1 | 11/2012 | Reiche | |
| 2012/0296716 A1 | 11/2012 | Barbeau | |
| 2012/0302329 A1 | 11/2012 | Katz | |
| 2012/0309504 A1 | 12/2012 | Isozaki | |
| 2012/0311504 A1 | 12/2012 | Van Os et al. | |
| 2012/0322545 A1 | 12/2012 | Arnone et al. | |
| 2012/0322561 A1 | 12/2012 | Kohlhoff | 463/42 |
| 2012/0329549 A1 | 12/2012 | Johnson | |
| 2012/0330785 A1 | 12/2012 | Hamick et al. | |
| 2013/0005437 A1 | 1/2013 | Bethke | |
| 2013/0005466 A1 | 1/2013 | Mahajan | |
| 2013/0005473 A1 | 1/2013 | Bethke | |
| 2013/0005480 A1 | 1/2013 | Bethke | |
| 2013/0006735 A1 | 1/2013 | Koenigsberg et al. | |
| 2013/0006736 A1 | 1/2013 | Bethke | |
| 2013/0012304 A1 | 1/2013 | Cartwright | |
| 2013/0013094 A1 | 1/2013 | Parks et al. | |
| 2013/0013326 A1 | 1/2013 | Miller et al. | |
| 2013/0013459 A1 | 1/2013 | Kerr | |
| 2013/0029745 A1 | 1/2013 | Kelly et al. | |
| 2013/0036064 A1 | 2/2013 | Osvald | |
| 2013/0072278 A1 | 3/2013 | Salazar | |
| 2013/0079087 A1 | 3/2013 | Brosnan | |
| 2013/0090173 A1 | 4/2013 | Kislyi | |
| 2013/0090750 A1 | 4/2013 | Herrman et al. | |
| 2013/0095914 A1 | 4/2013 | Allen | |
| 2013/0123005 A1 | 5/2013 | Allen et al. | |
| 2013/0124361 A1 | 5/2013 | Bryson | |
| 2013/0151342 A1 | 6/2013 | Citron et al. | |
| 2013/0173393 A1 | 7/2013 | Calman | |
| 2013/0178259 A1 | 7/2013 | Strause et al. | |
| 2013/0210511 A1 | 8/2013 | LaRocca | |
| 2013/0217453 A1 | 8/2013 | Briggs | |
| 2013/0217489 A1 | 8/2013 | Bendayan | |
| 2013/0226733 A1 | 8/2013 | Evans | |
| 2013/0237299 A1 | 9/2013 | Bancel et al. | |
| 2013/0244767 A1 | 9/2013 | Barclay et al. | |
| 2013/0288757 A1 | 10/2013 | Guthridge | |
| 2013/0288787 A1 * | 10/2013 | Yoshie | A63F 13/00 463/30 |
| 2013/0290147 A1 | 10/2013 | Chandra | |
| 2013/0303276 A1 | 11/2013 | Weston et al. | |
| 2013/0303726 A1 | 11/2013 | Mozzarelli | |
| 2013/0310164 A1 | 11/2013 | Walker | |
| 2013/0324259 A1 | 12/2013 | McCaffrey | |
| 2013/0339111 A1 | 12/2013 | Ross | |
| 2013/0339228 A1 | 12/2013 | Shuster | |
| 2013/0344932 A1 | 12/2013 | Adams et al. | |
| 2014/0004884 A1 | 1/2014 | Chang | |
| 2014/0011565 A1 | 1/2014 | Elias | |
| 2014/0018156 A1 | 1/2014 | Rizzotti et al. | |
| 2014/0033262 A1 | 1/2014 | Anders | |
| 2014/0038679 A1 | 2/2014 | Snow | |
| 2014/0038721 A1 | 2/2014 | Archer | |
| 2014/0067526 A1 | 3/2014 | Raju | |
| 2014/0067544 A1 | 3/2014 | Klish | |
| 2014/0073436 A1 | 3/2014 | Takagi | |
| 2014/0087864 A1 | 3/2014 | Togashi | |
| 2014/0089048 A1 | 3/2014 | Bruich | |
| 2014/0100020 A1 | 4/2014 | Carroll | |
| 2014/0106858 A1 | 4/2014 | Constable | |
| 2014/0128137 A1 | 5/2014 | Balise | |
| 2014/0157314 A1 | 6/2014 | Roberts | |
| 2014/0180725 A1 | 6/2014 | Ton-That | |
| 2014/0206452 A1 | 7/2014 | Bambino | |
| 2014/0243065 A1 | 8/2014 | Wright | |

(56) References Cited

U.S. PATENT DOCUMENTS

| | | | |
|---|---|---|---|
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0019349 A1 | 1/2015 | Milley |
| 2015/0031440 A1 | 1/2015 | DeSanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

Wikipedia, Mafia Wars, <http://en.wikipedia.org/wiki/Mafia_Wars>, Jan. 28, 2012, 3 pages.

Quest item—WoWWiki—Your guide to the World of Warcraft <URL: http://www.wowwiki.com/Quest_Item> Retrieved on Apr. 16, 2014, 1 page.

PCT International Search Report and Written Opinion for PCT/US2016/017637 dated Apr. 7, 2016, 12 pages.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-u pgrade-anything-in-my-village-what-can-I-do->, Apr. 23, 2014, 9 pages.

"Behavioural Analytics & Campaigning", http://lotaris.com/behavioural._analytics_and._Campaigning.htm, screenshot access date May 24, 2012 2:21 PM, 1 page.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

FriskyMongoose "Happy Island Updates", available Jun. 12, 2012 from https://web.archive.org/web/20120612004417/http://friskymongoose.com/happy-island-updates-new-attractions-deco-rations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . ., posted Tuesday, Mar. 27, 2012, screenshop access date May 24, 2012, 2:19 PM, 1 page.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php?title=Getting_Started&oldid=349681>. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store&oldid=396550>,<http://lotrowiki.com/index.php?title=Ouest:A_Little_Extra_Never_Hurts_--_Part_1 &oldid=399597> (28 pgs).

"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.

"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091>. 4 pages.

"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.

Dreamslayer's Enchanting and Upgrading Guide—With Pictures:D and Explanations, URL: forums.elswordonline.com/Topic5673.aspx [Retrieved Feb. 21, 2013], 10 pages.

Elsword—Wikipedia, the free encyclopedia, URL: en.wikipedia.org/wiki/Elsword [Retrieved Feb. 21, 2013], 6 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

(56) References Cited

OTHER PUBLICATIONS

MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums> Kingdoms of Camelot> Kingdoms of Camelot Open Discussion> Open Discussion: Tournament of Might Prizes/ Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
Profession—WoWWiki—Your guide to the World of Warcraft, URL: http://www.wowwiki.com/Profession, printed Nov. 6, 2012, 8 pages.
TFF Challenge—UC Davis, http://tffchallenge.com/team/uc-davis/, printed Jan. 15, 2014, 12 pages.

\* cited by examiner

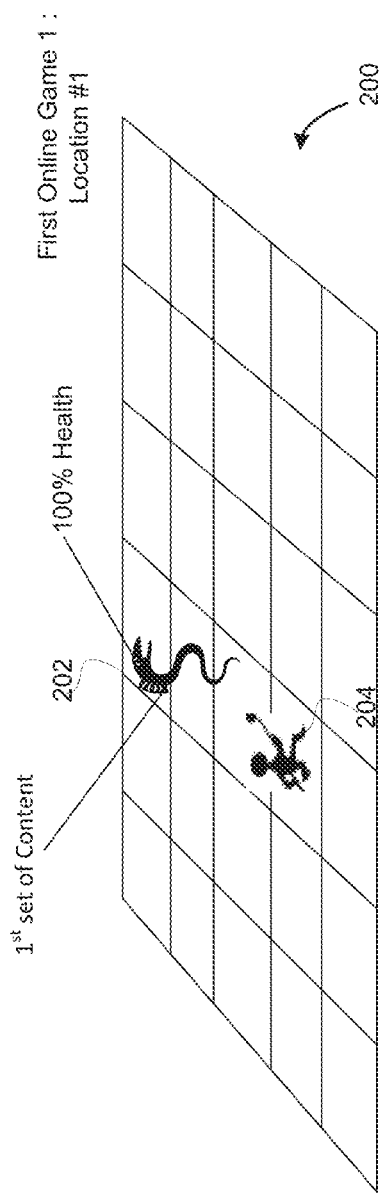
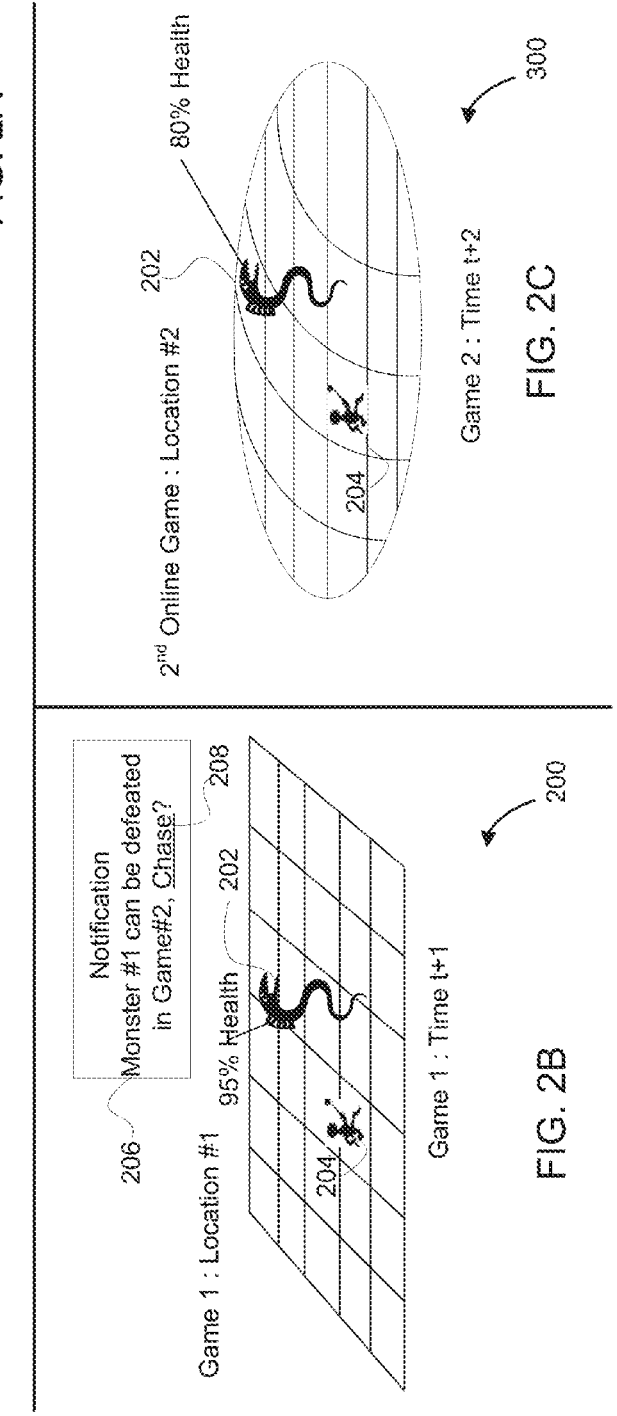
FIG. 2A
FIG. 2B
FIG. 2C

FACILITATING CONTENT ACCESS ACROSS ONLINE GAMES

FIELD OF THE DISCLOSURE

This disclosure relates to facilitating content access across multiple online games, the content access being facilitated such that defeating a non-player character in one online game by a user may impact the user's access to a set of content in another online game.

BACKGROUND

Facilitating player versus environment (PvE) combat in an online game is known. Conventional gaming system typically enables a player to control a player character in the online game to fight one or more non-player characters such as monster, boss, and other types of non-player characters in a PvE combat. In those systems, the PvE combat typically results in either the player character or the non-player character being defeated by the other.

Gating game content using non-player characters in an online game is known. A set of game content can be gated by one or more non-player characters such that access to the set of game content is granted upon the one or more non-player characters being defeated.

SUMMARY

One aspect of the disclosure relates to facilitating content access across multiple online games. A set of content may be gated by a given non-player character (or given non-player characters) in a first online game. Access to this set of content in the first online game may be granted to a user based on the user defeating a corresponding non-player character (or characters) in a second online game. The corresponding non-player character in the second online game may have the same or similar attribute(s), visual appearance and/or any other characteristics as the given non-player character in the first online game. In some examples, the corresponding non-player character in the second online game may share the same entity state with the given non-player character in the first online game such that they may appear to be the same character in the first and second online games. The resource and/or virtual items that may be used or required for the user to defeat the given non-player character in the first online game may not be available in the second online game for the user to defeat the corresponding character, or vice versa. In some examples, the corresponding non-player character in the second online game may be made easier to be defeated by the user in the second online game than the given non-player character in the first online game. In some examples, defeating corresponding non-player character in the second online game may "weaken" (reduce attributes of) the strength, power, morale, movement, ability, magic spell and/or any other characteristics of the given non-player character in the first online game. This may incentivize users to interact with the second online game for accessing content in the first online game and hence improve monetization opportunities to the provider(s) of the first and second online games. This may improve user experience in interacting with online games as their progression in the one online game may be impacted by gameplays in another online game.

A system configured to facilitate accessing content across multiple online games may include one or more servers. The servers may operate in a client/sewer architecture with one or more client computing platforms. The client computing platforms may be associated with the users of the virtual space. The servers may be configured to execute one or more of: a game component, a character component, a content component, a combat component, a notification component and/or other components.

The game component may be configured to execute an instance of a given online game such as a first online game, a second online game or any other online game. The instance of the given online game executed by the game component may be associated with a given game space in which gameplays may be facilitated for users of the given online game. Within the given game space, users may control one or more of an element in the given game space. The users may input commands with specific parameters to undertake specific deeds, maneuvers, actions, functions, spheres of actions and/or any other types of interactions within the given game space.

The character component may be configured to manage characters within a given game space associated with a given online game. The characters managed by the character component may include characters controlled by artificial intelligence (non-player characters). A given non-player character managed by the character component may be associated with a given location within the given game space. The given location associated with the given non-player character may include, but not limited to, a tile, a room, an area, a village, a town, a mountain, and any other types of locations within the given game space. The given non-player character managed by the character component may be associated with one or more character attributes. The character attributes may include, but not limited to, health (e.g., hit points), strength, power, mana, spell, morale, weapons, magic items, gear, speed, level, appearance, race, initiative score, action points, skills, ability score, defense abilities, attack abilities, special abilities, and/or any other attributes. In some examples, the non-player characters in different online games as managed by the character component may share the same or similar character attributes described above. In implementations, the character component may be configured to keep state information for the given non-player character.

Content component may be configured to manage access to a set of content provided in the online games hosted by server(s) for user interaction. The access of the set of content managed by the content component may include, but not limited to access to virtual items resources, events, tasks, stages, areas within a given game space, user progression opportunities, story progression opportunities, and/or any other types of content within the given online game. The access to a given set of content as managed by the content component may be guarded (gated) by a non-player character described herein. The content component may determine whether to grant access the given set of content based on an entity state associated with the non-player character(s) guarding (gating) the given set of content in the given online game. The non-player character(s) guarding the given set of content in the given online game may be defeated or weakened in another online game. In some examples, resources and/or virtual items needed for defeating the non-player characters in different online games may be different. For instance, a first set of resources and/or virtual items may be needed to defeat the non-player characters in the first online game, while a second set of resources and/or virtual items may be needed to defeat the corresponding characters in the second online game.

The combat component may be configured to facilitate user actions from a given user in combats in a given game space (e.g., the first game space, second game space, and/or other game space) associated with a given online game for defeating one or more non-player characters. The combats facilitated by the combat component may include real-time combat, turn-based combat, and other type(s) of combats. The combats facilitated by the combat component may include player character(s) versus non-player character(s), and other type(s) of combats involving other type(s) rivalries. Facilitating a given combat by the combat component may include evaluating combat actions by the rivalries involved in the given combat for determination a result of the given combat. Evaluating combat actions by the rivalries involved in the given combat may be based on one or more combat conditions. The result of the given combat may include retreat by a non-player character involved in the given combat. The retreat by the non-player character may include escaping to another game space associated with another game space. For example, without limitation, a non-player character involved in a combat taking place in the first online game may retreat from the combat and escape to the game space associated with the second online game.

The notification component may be configured to generate notifications for notifying users in a given online game that the access to a set of game content in the given online game can be made available to the user upon the user defeating the non-player characters and/or characters corresponding to the non-payer characters in another online game. The notifications generated by the notification component may include notifications internal and/or external to online games hosted by system. The notifications generated by the notification component may notify users that the non-player character(s) guarding (gating) a set of content in the given online game, e.g., the first online game, may be defeated by the user in another online game, e.g., the second online game. In some examples, a given notification generated by the notification component may include information notifying the user in the given online game, e.g., the first online game, of a location where the non-player character(s) may be found or encountered by the user in another online game, e.g., the second online game. In some examples, the information included in the given notification generated by the notification component may facilitate the user to switch to another online game to encounter the non-player character(s) there.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates an example wherein a user character encounters a non-player character in a game space associated with the first online game.

FIG. 2B illustrates an example wherein the user controlling the user character shown in FIG. 2A is notified that the non-player character may be defeated by the user in a second online game.

FIG. 2C illustrates an example wherein the user has switched to a game space associated with a second online game for encountering the non-player character shown in FIGS. 2A-B in the second online game.

DETAILED DESCRIPTION

Figure 1:
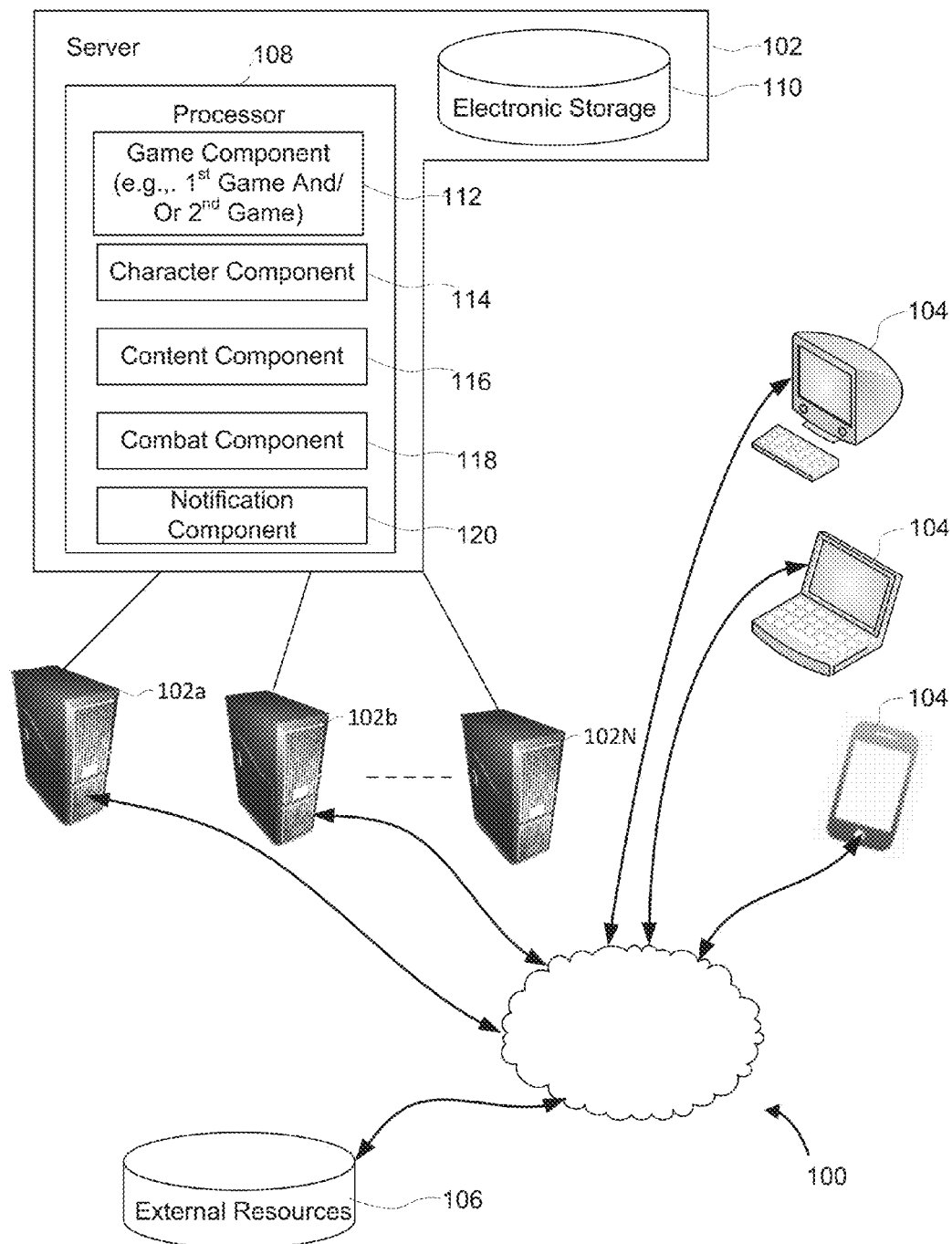
FIG. 1 illustrates a system to facilitate accessing content across multiple online games in accordance with the disclosure.

FIG. 1 illustrates a system 100 to facilitate accessing content across multiple online games in accordance with the disclosure. Providing the online games may include hosting the online games over a network. In some implementations, as shown in this example, system 100 may include servers 102 configured for hosting online games. In this example, as shown, system 100 includes a server 102 configured for facilitating cross-game non-player character retreating in accordance with the disclosure. The servers 102 may be configured to communicate with one or more client computing platforms 104 according to a client/server architecture, and with each other. The users may access system 100 and/or the game spaces associated with the online games via client computing platforms 104. As shown, the servers 102 may comprise processors 108 configured to execute computer readable instructions to implement system components. The computer program components may include one or more of a game component, a character component 114, a content component 116, a combat component 118, a notification component 120, and/or other components.

The game component 112 may be configured to execute an instance of a given online game. The given online game may include a first online game, a second online game, or any other online game. Within the instance of the first online game, users of the first online game may interact with elements in the first online game and/or with each other through gameplays provided by the first online game. The gameplays may include role-playing, first-person shooter, real-time strategy, turn-based strategy, simulation, music or rhythm playing, social interaction, twitching and/or any other gameplays. The execution of the instance of the first online game by game component 112 may include determining a state associated with the first online game. The state may be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a first game space associated with the first online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the first online game may be persistent. That is, the first online game may continue on whether or not individual users are currently logged in and/or participating in the online game. A user that logs out of the first online game and then logs back in some time later may find the first game space associated with the first online game has been changed through the interactions of other users with the first game space during the time the user was logged out. These changes may include changes to the simulated physical space, changes in the user's inventory, changes in other users' inventories, changes experienced by non-user characters, and/or other changes.

The instance of the first online game may comprise a simulated game space, e.g., a first game space that is accessible by users via clients (e.g., client computing platforms 104) that present the views of the first game space to a user. The first game space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the first online game may comprise virtual space entities automatically controlled in the instance of the first online game. Such virtual space entities may not be associated with any user. As such, the automatically controlled virtual space entities may be generated and/or developed by artificial intelligence configured with the server 102 by a provider, administrator, moderator, and/or any other entities related to the online game. These automatically controlled entities may evolve within the virtual space associated with the first online game free from user controls and may interact with the entities controlled by or associated with the users, other automatically controlled virtual space entities, as well as the topography of the first game space. Certain manifested traits may be associated with the automatically controlled entities in accordance with the artificial intelligence configured with the server 128. As used herein, such automatically controlled virtual space entities in the instance of the online game are referred to as "non-player entities".

The above description of the manner in which state of the first game space associated with the first online game as determined by game component 112 is not intended to be limiting. The game component 112 may be configured to express the first game space in a more limited, or richer, manner. For example, views determined for the first game space representing the state of the instance of the first game space may be selected from a limited set of graphics depicting an event in a given pace within the first game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the first online game executed by game component 112, the users may participate in the instance of the first online game by controlling one or more of an element in the first game space associated with the online game. The user-controlled elements may include avatars, game space characters, game space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the first game space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. The objects controlled by the users may include weapons, vehicles, projectiles, magic items, wardrobes, boots, armor, knapsacks, medicine, healing potion, and/or any other virtual items that may be employed by the users for interaction within the first online game.

In any case, the user-controlled elements may move through and interact with the first game space (e.g., non-player entities, elements controlled by other users and/or topography in the virtual space) associated with the first online game. The elements controlled by a given user may be created and/or customized by the given user. The given user may have an "inventory" of virtual goods and/or currency usable within the first game space.

Controls of virtual elements in the first game space may be exercised through commands input by a given user through client computing platforms 104. The given user may interact with other users through communications exchanged within the first game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 112).

A given user may input commands with specific parameters to undertake specific deeds, actions, functions, spheres of actions and/or any other types of interactions within the first game space. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with non-player entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities.

In some examples, the given user may input commands to compete against each other within the virtual space—i.e., Player vs. Player (PvP) activities.

The game component 112 may be configured to execute user actions to facilitate interaction of the users with the first game space and/or each other in response to receiving virtual space commands input by the users. Execution of the user action by the game component 112 may produce changes to the game state, which may reflect progresses and/or results of the user actions. In some examples, state changes caused by the execution of the user actions may be recorded in the electronic storage 110 to facilitate persistency throughout the instance of the first online game. In some examples, execution of the user actions may not produce persistent changes to the game state (e.g., a user character jumping forward and backward successively may not produce any perceivable game state changes to other users).

It should be understood that individual servers 102 shown in FIG. 1 may comprise corresponding game components 112 configured with functionalities described above and attributed to game component 112. For example, an instance of a second online game may be executed by a game component 112 in a server 102 (the same as or different from the server 102 contains the game component 112 configured for executing the instance of the first online game). A second game space may be associated with the second online game. The second game space may provide gameplays similar to or different from those provided by the first game space. In some examples, the second online game may be hosted by a server 102 (or servers) different from that (or those) hosting the first online game. In some other examples, first and second online games may be hosted by the same server 102.

In any case, the second game space associated with the second online game may be separate and discrete from the first game space associated with the first online game. Such a property of separation between the first and second online games may involve separate client-side applications for invoking respective online games, separate game space interfaces, separate game states, separate game characters, separate game rules, separate game mechanics, separate game objectives, separate users, and/or any other separate properties that distinguish the first game space associated with the first online game from the second game space associated with the second online game. By way of non-limiting example, the first online game may be an online game in which users play kingdom lords in the first game space that simulates a medieval world; and the second online game may be an online game in which users play future characters within the second game space that simulates a future world. In that example, the first online game may be separate and discrete from the second online game such that users of the first online game may not interact with the second game space from the first online game (e.g., through a game space interface of the first online game); and the users of the second online game may not interact with the first game space from the second online game. As described above, this may involve, but not be limited to, facilitating different game space interfaces for user interaction with the first online and second online games (e.g., a dedicated game space interface for the first online game and a dedicated game space interface for the second online game), maintaining separate state information corresponding to the first and second game spaces, maintaining separate user accounts associated with the first and second online games, providing different gameplays, characters, simulations, topography, and/or any other elements in first online game than in the second online game, and/or any other operations for operating the first and second online games separately and independently.

In some examples, the first and second online games may be developed and/or hosted by the same provider(s). In those examples, an interface may be implemented on a client computing platform 104 enabling a user to select in which online game to participate. For example, an icon representing the first online game and an icon representing the second online game may be presented in the interface side by side for the user to select in which online game to participate. In some other examples, the first and second online games may be accessed through webpages over the Internet such that users may be logged into the first or second online games through the webpages. Other examples of accessing first and second online games are contemplated.

The character component 114 may be configured to manage characters within a given game space (e.g., the first game space, second game space, and/or other game space) associated with a given online game. For example, a server 102 configured to host the first game may contain a character component 114 configured to manage characters appearing in the first online game; a server 102 configured to host the second game may contain a character component 114 configured to manage characters appearing in the second online game; and so on. In some examples, the character component 114 may be an integrated character component configured to manage characters appearing in the first game space, the second game space, and any other game space associated with any other online game hosted by a given server 102.

The characters managed by the character component 114 may include characters controlled by artificial intelligence. Such a character managed by the character component 114 may not be controlled a player of the online game and is referred to as a non-player character herein. A given non-player character may be associated with a given location within the given game space, such as, but not limited to, a tile, a room, an area, a village, a town, a mountain, and any other types of locations within the given game space. For example, without limitation, the given non-player character managed by the character component 114 may include an antagonist character in the first game space guarding treasures at a dark room inside a dungeon within the first game; a barbarian character hidden in a forest within the second game space and attacks player character randomly when the player character passes by the forest, just to illustrate a few. Some types of non-player characters managed by the character component 114 may be engaged by a player through a player character in a certain way, such as, but not limited to, requiring the player to use certain weapon, magic spell, specific action sequence, hitting the non-player character in certain body area, or any other ways.

The given non-player character may have a visual appearance visible in the online game. The visual appearance of the non-player character may include, but not limited to, facial expression, garments, apparel, accessories, body shape, muscle tone, size, color, and/or any other type of visual appearance associated with the given non-player character in the given online game.

The given non-player character managed by the character component 114 may be associated with one or more character attributes. The character attributes may include, but not limited to, health (e.g., hit points), strength, power, mana, spell, morale, weapons, magic items, items carried, speed, level, appearance, race, initiative score, action points, skills, ability score, defense abilities, attack abilities, special abilities, and/or any other attributes.

The level attribute associated with the given non-player character may reflect relative adventure experiences by the given non-player character in the game space. For example, a level 10 non-player character may be more powerful and able to take tougher challenges than a level 5 non-player character. With each new level the given non-player character attains in the game space, the non-player character becomes more powerful and capable, which may be reflected by enhancements in various characteristics associated with the given non-player character. In some exemplary implementations, the level associated with the given non-player character may be manifested via numerical number(s) expressed as experience points ("XP").

The ability attribute associated with the given non-player character may include strength, dexterity, constitution, intelligence, wisdom, charisma, perception, diplomacy, negotiation, and/or any other abilities. Typically, the abilities associated with the given non-player character may be represented by numeric score, reflecting quality of these abilities by the given non-player character. For example, the given non-player character may be associated with an ability score of 18 (out of 20) in strength, which may mean the given non-player character has excellent strength. On the other hand, the given non-player character may be associated with an ability score of 5 (out of 20) in wisdom, which means the given non-player character has poor intelligence. Typically, as the given non-player character progress through adventures in the game space, the ability scores associated with the given non-player character may increase or decrease along with the level associated with the given non-player character; and the given non-player character may acquire new abilities when reaching certain milestones in the game space.

A number of hit points may be associated with the given non-player character reflecting how much damage the given payer character may withstand from attack; a number of stamina points may be associated with the given non-player character reflecting how much energy the given player character may expend for actions; and so on. Some types of non-player characters may be associated with more hit points, stamina, strength, power, magic spell, and/or any other attributes related to attack abilities than normal non-player characters in the given space. For example, bosses in the given space may be such non-player character with superior health and/or power. This type of non-player characters may be associated with health bar which may be displayed either on or near the non-player characters.

The skill attributes associated with the given non-player character may represent training, education and/or any other learned aspects of the given non-player character in the game space. Common examples of skills that may be associated with the given non-player characters may include, but not limited to, perception, thievery, evasion, healing, endurance, diplomacy, religion, and any other skills.

The given non-player character managed by the character component 114 may be associated with an inventory of one or more virtual items controlled by the given non-player character in the given game space. For example, the given non-player character may carry virtual items such as, without limitation, sword, armor, glove, healing potion, and/or any other virtual items as gear in the given game space. The inventory of virtual items associated with the given non-player character may be dropped by the non-player character, for example upon the given non-player character having been defeated in the given game space.

It should be understood the above description of non-player character attributes is not intended to be exhaustive, but rather is merely illustrative. One skilled in the art will understand non-player character attributes may include many other attributes suitable for a given online game they appear in.

In some examples, the non-player characters in different online games as managed by the character component 114 may share the same or similar character attributes described above. For example, without limitation, an antagonist non-player character may be managed by the character component 114 for user interaction in the first online game and may be associated with a first set of attributes; and another non-player character corresponding to the first non-player character may be managed by the character component 114 for user interaction in the second online game. In that example, the non-player character attributes included in the first set may be the same as or similar to those included in the second set. For instance, a non-player dragon character may guard a mountain pass in the first online game and the same dragon character may guard a treasure trove in the second online game.

In implementation of those examples, the character component 114 may be configured to keep state information for the given non-player character reflecting values of various character attributes. As used herein, an entity state is referred to a state of an entity in a given online game at a given time during execution of the instance of the given online game. In the case of a non-player character, the entity of the non-player character may reflect a state of attributes associated with the non-player character (e.g., via attribute values and/or visual appearance) at a given time. In accordance with some embodiments of the disclosure, some non-player characters managed by the character component 114 may be associated with the same entity states across the online games. By way of non-limiting example, a goblin non-player character may be managed by the character component 114 such that it appears as the same character in the first online game and second online game. In implementations of that example, the goblin non-player character may be associated with the same entity state managed by the character component 114 in the first and second online games such that a state change to the goblin non-player character in the first online game is also reflected in the second online game. For example, if the goblin non-player character's health is reduced in the first online game by 50% to 100 health points (e.g., by a player character in the first online game), that change s also reflected in the second online game such that the non-player character goblin character only has 100 health points in the second online game. In this way, the non-player characters managed by the character component 114 may be connected in multiple online games hosted by the server(s) 102.

Content component 116 may be configured to manage access to a set of content provided in the online games hosted by server(s) 102 for user interaction. The access of the set of content managed by the content component 116 may include, but not limited to access to virtual items, resources, events, tasks, stages, areas within a given game space, user progression opportunities, story progression opportunities, and/or any other types of content within the given online game. The access to a given set of content as managed by the content component 116 may be guarded (gated) by a given non-player character (or non-player characters) described herein. In implementations, an association between the given set of content and the given non-player character may be managed by the content component 116.

As described above, the given set of content whose access is managed by the content component 116 in a given online game may include virtual items. The virtual items may include, but not limited to, weapons, speedup items, armors, spell books, magic items, gears, learning scrolls, garments, mounts, craft equipment, craft ingredient, craft recipe, and many other virtual items provided in the given online. For example, without limitation, the character component 114 may manage access to a rare sword item in the first online game, wherein the sword item is guarded (gated) by a non-player character dragon in the first online game such that upon defeating the non-player character dragon by a user, access to the sword item may be granted (e.g., the sword may be picked up by the user and added to the user inventory in the first online game) to the user.

The given set of content whose access is managed by the content component 116 in a given online game may include recourses usable in the given online game. The resources may include, but not limited to, timber, gold, stone, gem, coal, ore, oil, wheat, fish, and many other types of resources provided in the given online game.

It should be understood the given set of content whose access is managed in the given online game may not be necessarily limited to virtual items and/or resources. In some examples, as described above, the given set of content may include events, stages, tasks, user progression opportunities, and/or any other types of progressive content in the given online game for user interaction. For example, the given set of content may include one or more events in the online game such that upon defeating the non-player character(s) guarding (gating) the access to this set of content, the events in the set are made available for the user to access. For instance, a monster boss may guard an exit point (or an entry point) to a stage, room, area, and/or any other game space construct in the given online game such that events in such a game space construct is made available for access by the user upon the user defeating the monster boss. In another example, the monster boss may guard a storyline progression in the online game such that subsequent events in the online game may transpire upon the user defeating the monster boss. Still in another example, the monster boss may guard an opportunity for user to progress in the online game such that the user may advance to a next level in the given online game upon defeating the monster boss. Other examples of progressive content in the given online game are contemplated.

The content component 116 may determine whether to grant access to the given set of content based on the entity state associated with the non-player character(s) gating (guarding) the given set of content in the given online game, e.g., the $1^{st}$ online game. As should be clear, the non-player characters guarding the given set of content in a given online game may be defeated or weakened in another online game. By way of non-limiting example, a user may engage in the second online game to defeat characters corresponding to the non-player characters guarding a set of content in the first online game. Upon the corresponding non-player characters are defeated by the user in the second online game, the content component 116 may grant the access to the given set of content guarded by the non-player characters in the first online game as if the non-player characters were defeated by the users in the first online game. In another example, the user may be enabled to weaken, e.g., attack and reduce health of the corresponding characters in the second online game first and finish off (defeat) the non-player characters in the first online game later to gain access to the given set of content guarded (gated) by the non-player characters in the first online game. In some examples, the non-player characters may retreat from one online game to another online game. For instance, the non-player characters may guard (gate) a set of virtual items acid/or resources, and upon user weakening the non-player characters in the second online game to certain threshold (e.g., 40% health left, 30% power left, 20% movement left, 10% morale left, and/or any other types of threshold), the non-player character may retreat to the first online game. The user may continue to engage the already weakened non-player characters in the first online game in order to gain the virtual items and/or resources guarded (gated) by the non-player characters. This may incentivize users to engage in different online games.

In some examples, resources and/or virtual items needed for defeating the non-player characters in different online games may be different. For instance, a first set of resources and/or virtual items may be needed to defeat the non-player characters in the first online game, while a second set of resources and/or virtual items may be needed to defeat the corresponding characters in the second online game. In some examples, the resources and/or virtual items in the second set may require less time or progression on the user's part in the second online game than those required in the first online game. For instance, as an illustration, a non-player character dragon may appear both in the first and second online games. In that instance, the non-player character dragon may require a user to acquire certain skills and a rare sword item to be defeated by the user in the first online game, while it may require less skills and no special virtual item on the user's part to defeat the dragon (or a corresponding character) in the second online game. In this way, the user may be incentivized to interact with the second online game to gain access to content in the first online game guarded (gated) by the non-player character dragon in the first online game.

The combat component 120 may be configured to facilitate user actions from a given user in combats in a given game space (e.g., the first game space, second game space, and/or other game space) associated with a given online game for defeating one or more non-player characters. In some examples, separate combat components 120 may facilitate combats for multiple online games: for instance, separate combat components 118 may be employed in those examples to facilitate combats in the first online game and the second online game. In some other examples, an integrated combat component may be provided to facilitate combats for the first online game, the second online game, and/or any other online game.

The combats facilitated by the combat component 118 may include real-time combat, turn-based combat, and other type(s) of combats. In the real-time combat, combat actions by parties involved in the combat may be performed in real-time simulating real-world combat. In the turn-base combat, users and non-player may take turns to initiate combat actions.

The combats facilitated by the combat component may include player character(s) versus non-player character(s), and other type(s) of combats involving other type(s) rivalries. When a combat is between player character(s) and non-player character(s), either side may perform combat actions. The combat actions may include, but not limited to, moving, attacking, casting a sped, drinking a potion, healing, maneuvering for combat position, retreating and/or any other combat actions.

Facilitating a given combat by the combat component 120 may include evaluating combat actions by the rivalries involved in the given combat for determination of a result of the given combat. For example, combat component 120 may evaluate an amount of damage incurred by player character to non-player character through an attack action; evaluate a position maneuvered into by non-player character as being disadvantageous (e.g., a checkmate type of situation); evaluate a success of magic spell cast by non-player character; and any other types of evaluation for combat results. Evaluating combat actions by the rivalries involved in the given combat may be based on one or more combat conditions. For example, without limitation, the combat component 120 may determine that a non-player character's hit points have dropped below a threshold value due to damage incurred by a rivalry player character during the combat.

The result of the given combat may include retreat by a non-player character involved in a combat. The retreat by the non-player character may include escaping to another game space associated with another game space. For example, without limitation, a non-player character involved in a combat taking place in the first online game may retreat from the combat and escape to the game space associated with the second online game.

The notification component 120 may be configured to generate notifications for notifying users in a given online game that the access to a set of game content in the given online game can be made available to the user upon the user defeating the non-user characters and/or characters corresponding to the non-player characters in another online game. The notifications generated by the notification component 120 may include notifications internal and/or external to online games hosted by system 100. Internal notifications may include pop-up messages in a given online game, internal email messages through a mail system provided by the given online game, audible voice messages in the given online game announcing the notification, visual representations depicting the notification, and/or any other types of internal notifications presented to a user within a given online game. External notifications may include push notifications, external electronic messages facilitated by a third party, audible or visual notifications when users are not logged in the given game space, and any other types of external notifications.

The notifications generated by the notification component 120 may notify users that the non-player characters guarding (gating) a set of content in the given online game, e.g., the first online game may be defeated by the user in another online game, e.g., the second online game. By way of non-limiting example, a goblin character may guard a given set of content in the first online game. In that example, upon the user encountering the goblin character in the first online game, a notification may be generated by the notification component 120 to notify the user that the user may also defeat the goblin character in the second online game to gain access to the given set of content guarded by the goblin character.

In some examples, a given notification generated by the notification component 120 may include information notifying the user in the given online game, e.g., the first online game of a location where the non-player character(s) may be found or encountered by the user in another online game, e.g., the second online game. For instance, the given notification may include information indicating that the goblin character appearing in the first game may be encountered at a virtual space location (e.g., a village) in the second online game. Such location information regarding the whereabouts of the non-player character(s) in the second online game may help user locate the non-player character(s) in another online game that the user is not currently interacting with.

In some examples, the information included in the given notification generated by the notification component 120 may facilitate the user to switch to another online game to encounter the non-player character(s). By way of non-limiting example, without limitation, the information may include a button, a link or any other types of controls enabling the user to switch to the second online game to encounter the non-player character(s) therein. For instance, the notification generated by the notification component 120 notifying the user that the goblin character may be defeated in the second online game may include a link such that upon user clicking or tapping the link, the user is automatically switched from the game space associated with the first online game to the game space associated with the second online game.

FIGS. 2A-C illustrate an example of providing content access across multiple online games in accordance with the disclosure. They will be described with references to FIG. 1. FIG. 2A illustrates at time T, a user character 204 encounters a non-player character 202 in a game space 200 associated with the first online game. As illustrated, the non-player character 202 may guard (gate) a set of content such that access to the set of content may be granted to the user controlling the user character 204 upon the user defeating the non-player character 202. FIG. 2B illustrates at time T+1, the user controlling the user character 204 is notified (e.g., response to the user clicking on the non-player character 202 for exploring information regarding the non-player character 202) that the non-player character 204 may be defeated by the user in the second online game via a notification 206. As shown in this example, the notification 206 may include a control 208 (e.g., a link in this example) enabling the user to switch to the second online game to encounter the non-player character 206 there. FIG. 2C illustrates, at time T+2, the user has switched to the game space 300 associated with the second online game and is encountering the non-player character 206 there. As can be seen, the user has weakened the non-player character 206 in the second online game to 80% health. As described herein, in some examples, access to the set of content in the first online game may be granted to the user upon the user defeating the non-player character in the second online game 300. In some other examples, the user may be required to finish off (defeat) the non-player character in the first online game 200 after weakening the non-player character in the second online game (e.g., the non-player character 206 may disappear in the second online game after the user has weakened the non-player character 206 to a certain threshold state).

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120. Processor 108 may be configured to execute components 112, 114, 116, 118, 120 by software; hardware; firmware; some combination of software, hardware, and/or firmware; and/or other mechanisms for configuring processing capabilities on processor 108.

It should be appreciated that although components 112, 114, 116, 118, 120 are illustrated in FIG. 1 as being co-located within a single processing unit, in implementations in which processor 108 includes multiple processing units, one or more of components 112, 114, 116, 118, 120 may be located remotely from the other components. The description of the functionality provided by the different components 112, 114, 116, 118, 120 described below is for illustrative purposes, and is not intended to be limiting, as any of components 112, 114, 116, 118, 120 may provide more or less functionality than is described. For example, one or more of components 112, 114, 116, 118, 120 may be eliminated, and some or all of its functionality may be provided by other ones of components 112, 114, 116, 118, 120. As another example, processor 108 may be configured to execute one or more additional components that may perform some or all of the functionality attributed below to one of components 112, 114, 116, 118, 120.

Figure 3:
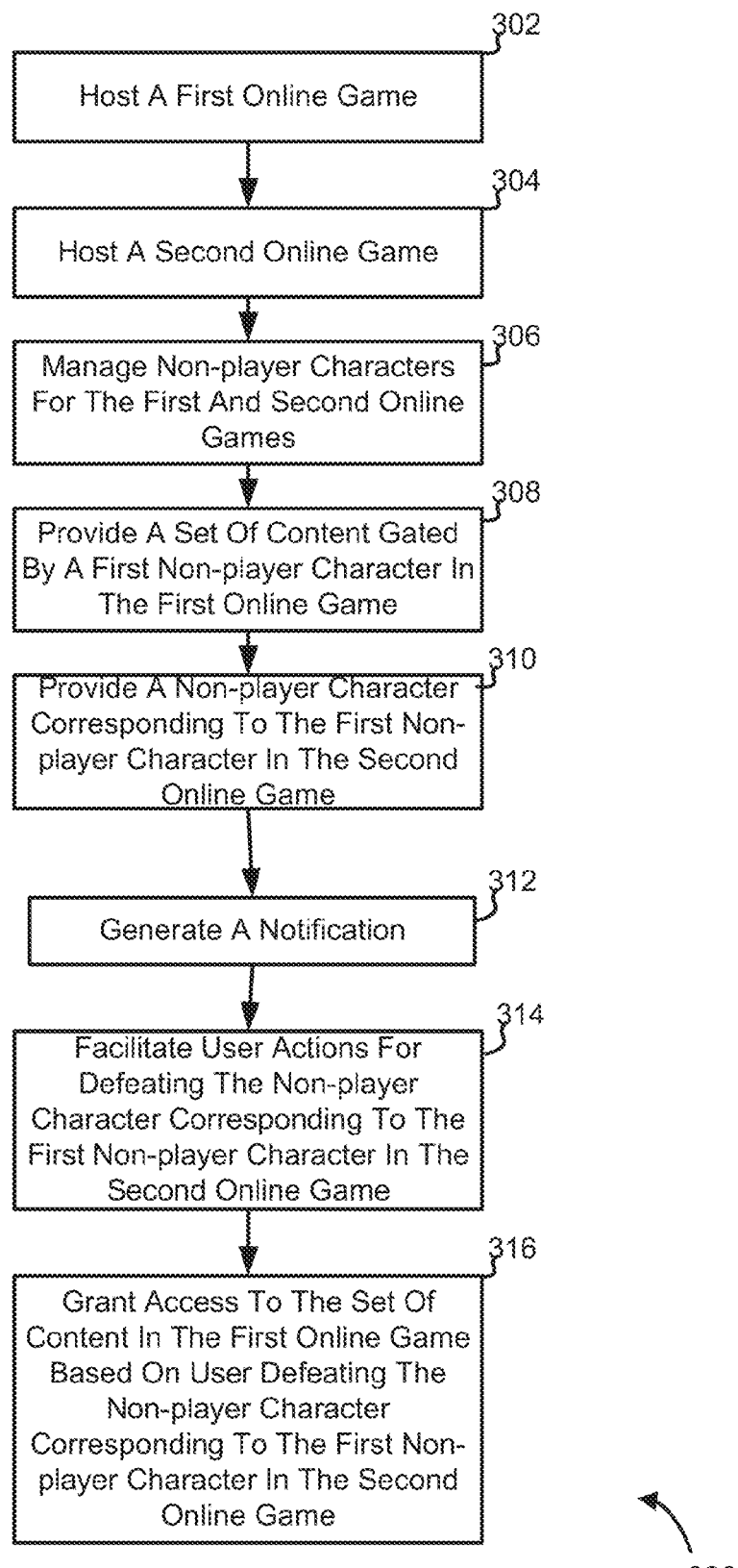
FIG. 3 illustrates one exemplary method for facilitating cross-game content access in multiple online games in accordance with the disclosure.

FIG. 3 illustrates one exemplary method 300 for facilitating cross-game content access in multiple online games in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a first online game may be hosted. In some implementations, operation 302 may be performed by a game component the same as or similar to game component 112 (shown in FIG. 1 and described herein).

At an operation 304, an instance of a second online game may be hosted. The second online game hosted in operation may be separate and discrete from the instance of the first online game hosted in operation 302. Such a property of separation between the first and second online games may involve separate client-side applications for invoking respective online games, separate game space interfaces, separate game states, separate game characters, separate game rules, separate game mechanics, separate game objectives, separate users, and/or any other separate properties that distinguish the first game space associated with the first online game from the second game space associated with the second online game. By way of non-limiting example, the first online game may be an online game in which users play kingdom lords in the first game space that simulates a medieval world; and the second online game may be an online game in which users play future characters within the second game space that simulates a future world. In that example, the first online game may be separate and discrete from the second online game such that users of the first online game may not interact with the second game space from the first online game (e.g., through a game space interface of the first online game); and the users of the second online game may not interact with the first game space from the second online game. In some implementations, operation 304 may be performed by a game component the same as or similar to game component 112 (shown in FIG. 1 and described herein).

At operation 306, non-player characters may be managed for the first and second online games. A given non-player character managed in operation 306 may be associated with a given location within the given game space, e.g., the game space associated with the first online game. The given location associated with the given non-player character may include, but not limited to, a tile, a room, an area, a village, a town, a mountain, and any other types of locations within the given game space. The given non-player character managed in operation 306 may be associated with one or more character attributes. The character attributes may include, but not limited to, health (e.g., hit points), strength, power, mana, spell, morale, weapons, magic items, items carried, speed, level, appearance, race, initiative score, action points, skills, ability score, defense abilities, attack abilities, special abilities, and/or any other attributes. In some implementations, operation 306 may be performed by a character component content component the same as or similar to character component 114 (shown in FIG. 1 and described herein).

At an operation 308, a set of content gated by a first non-player character managed by operation 306 may be provided in the first online game. The set of content managed by operation 308 may include, but not limited to access to virtual items, resources, events, tasks, stages, areas within a given game space, user progression opportunities, story progression opportunities, and/or any other types of content within the given online game. In some implementations, operation 308 may be performed by content component the same as or similar to content component 116 (shown in FIG. 1 and described herein).

At an operation 310, a non-player character corresponding to the non-player character provided in operation 308 may be provided in the second online game. In some examples, the non-player character provided in operation 310 may share the same entity state with the non-player character provided in the first online game such that they may appear as if they were the same character. In some examples, the non-player character provided in operation 310 may have similar attributes and/or visual appearance to the first non-player character provided in operation 308. Changes in one or more aspects of the non-player character provided in operation 310 may impact the first non-player character in the first online game. In some implementations, operation 310 may be performed by character component the same as or similar to character component 114 (shown in FIG. 1 and described herein).

At an operation 312, a notification may be generated to notify a user that the first non-player character provided in the first online game may be defeated by the user in the second online game. In some implementations, operation 312 may be performed by notification component the same as or similar to notification component 120 (shown in FIG. 1 and described herein).

At an operation 314, user actions for defeating the non-player character provided in operation 310 may be facilitated. In some implementations, operation 314 may be performed by a combat component the same as or similar to combat component 118 (shown in FIG. 1 and described herein).

At an operation 316, access to the set of content provided in operation 308 may be granted in the first online game based on user defeating the non-player character provided in operation 310 in the second online game. In some implementations, operation 316 may be performed by a content component the same as or similar to content component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for enabling cross-game user actions, the system comprising one or more physical processors configured by machine-readable instructions to:

host a first online game, the first online game being associated with a first game space, a first game space interface, and user accounts for the first online game, wherein hosting the first online game comprises:

managing a first set of non-user characters in the first game space for user interaction, the first set of non-user characters including a first non-user character;

providing sets of game content in the first game space for access by users of the first online game, the sets of game content being gated by non-user characters in the first game space such that access to the sets of game content are made available to the users upon the non-user characters gating the sets of game content being defeated, wherein the sets of game content include a first set of game contents being gated by the first non-user character; and facilitating actions from users of the first online game, via the first game space interface, for defeating non-user characters from the first set of non-user characters in the first game space; and host a second online game, the second online game being associated with a second game space and a second game space interface different from the first game space and the first game space interface, such that the second online game is discrete and separate from the first online game, wherein user accounts associated with the second online game are separate from the user accounts for the first online game, and wherein hosting the second online game comprises:

managing a second set of non-user characters in the second game space for user interaction, the second set of non-user characters including the first non-user character; and facilitating actions from users of the second online game, via the second game space interface, for defeating non-user characters from the second set of non-user characters in the second game space; and, wherein responsive to a first user of the second online game defeating the first non-user character in the second game space, access to the first set of game contents in the first game space is made available to the first user as if the first non-user character had been defeated by the first user in the first game space.

2. The system of claim 1, wherein the first non-user character is associated with a common character state shared by the first and second online games.

3. The system of claim 1, wherein the first non-user character is associated with a first entity state in the first online game and a second entity state in the second online game, where in the first and second entity states are separate.

4. The system of claim 1, wherein a change in an aspect regarding the first non-player character as reflected by a second entity state in the second online game impacts a first entity state associated with the non-player character in the first online game.

5. The system of claim 4, wherein the aspect includes health, morale, spell, power, troops, equipment, virtual resource(s), strength, agility, and/or movement associated with the first non-user character.

6. The system of claim 1, wherein the one or more physical processors are further configured to generate a notification for presentation to the first user in the second online game that the access to the first set of game contents in the first game space will be made available to the first user upon the first user defeating the first non-user character in the second game space.

7. The system of claim 6, wherein the notification includes information indicating a location in the first game space where the first set of game contents is being gated by the first non-user character.

8. The system of claim 6, wherein the notification includes a control facilitating the first user to switch from the first game space to the second game space for defeating the first non-player character in the second game space.

9. The system of claim 1, wherein the user actions are facilitated such that defeating the first non-player character requires resources and/or virtual items different from those required for defeating the first non-player character in the second online game.

10. A method for enabling cross-game user actions, the method being implemented in one or more physical processors configured by machine-readable instructions to execute computer programs, the method comprising:
    hosting a first online game, the first online game being associated with a first game space, a first game space interface, and user accounts for the first online game, wherein hosting the first online game comprises:
        managing a first set of non-user characters in the first game space for user interaction, the first set of non-user characters including a first non-user character;
        providing sets of game content in the first game space for access by users of the first online game, the sets of game content being gated by non-user characters in the first game space such that access to the sets of game content are made available to the users upon the non-user characters gating the sets of game content being defeated, wherein the sets of game content include a first set of game contents being gated by the first non-user character; and
        facilitating actions from users of the first online game, via the first game space interface, for defeating non-user characters from the first set of non-user characters in the first game space; and
    hosting a second online game, the second online game being associated with a second game space and a second game space interface different from the first game space and the first game space interface, such that the second online game is discrete and separate from the first online game, wherein user accounts associated with the second online game are separate from the user accounts for the first online game, and wherein hosting the second online game comprises:
        managing a second set of non-user characters in the second game space for user interaction, the second set of non-user characters including the first non-user character; and
        facilitating actions from users of the second online game, via the second game space interface, for defeating the non-user characters from the second set of non-user characters in the second game space; and, wherein
    responsive to a first user of the second online game defeating the first non-user character in the second game space, access to the first set of game contents in the first game space is made available to the first user as if the first non-user character had been defeated by the first user in the first game space.

11. The method of claim 10, wherein the first non-user character is associated with a common character state shared by the first and second online games.

12. The method of claim 10, wherein the first non-user character is associated with a first entity state in the first online game and a second entity state in the second online game, where in the first and second entity states are separate.

13. The method of claim 10, wherein a change in an aspect regarding the first non-player character as reflected by a second entity state in the second online game impacts a first entity state associated with the non-player character in the first online game.

14. The method of claim 13, wherein the aspect includes health, morale, spell, power, troops, equipment, virtual resource(s), strength, agility, and/or movement associated with the first non-user character.

15. The method of claim 10, further comprising generating a notification for presentation to the first user in the second online game that the access to the first set of game contents in the first game space will be made available to the first user upon the first user defeating the first non-user character in the second game space.

16. The method of claim 15, wherein the notification includes information indicating a location in the first game space where the first set of game contents is being gated by the first non-user character.

17. The method of claim 15, wherein the notification includes a control facilitating the first user to switch from the first game space to the second game space for defeating the first non-player character in the second game space.

18. The system of claim 1, wherein the user actions are facilitated such that defeating the first non-player character requires resources and/or virtual items different from those required for defeating the first non-player character in the second online game.

* * * * *